Patented Sept. 9, 1952

2,610,196

UNITED STATES PATENT OFFICE 2,610,196

ESTERS OF ACYLATED HYDROXYCARBOXYLIC ACIDS

Charles H. Fisher, New Orleans, La., and Martin L. Fein, Riverside, N. J., assignors to the United States of America as represented by the Secretary of Agriculture No Drawing. Application March 27, 1950, Serial No. 152,269

11 Claims. (Cl. 260—410.9)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America, for governmental purposes throughout the world, without the payment to us of any royalty thereon.

This application is a continuation in part of our copending application Serial No. 663,337 filed April 19, 1946, now Patent No. 2,518,456.

This invention relates to new compositions of matter and the methods of making the same, and, in particular, to compositions comprising an ester of acylated lactyllactic acid corresponding to the general formula:

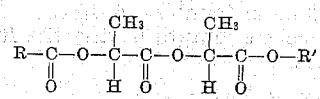

where R and R' are alkyl radicals.

We have found that such an ester is formed in admixture with the corresponding ester of acylated lactic acid having the general formula:

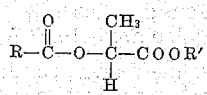

wherein R and R' represent the same alkyl radicals as in the foregoing formula, on reacting an alkyl lactate with a saturated, aliphatic monocarboxylic acid.

We have further found that the esters of acylated lactyllactic acid corresponding to the aforesaid general formula, wherein R and R' are alkyl radicals containing from 5 to 17 and from 2 to 12 carbon atoms, respectively, as well as mixtures of such an ester with the corresponding ester of acylated lactic acid, are substances having properties which render them useful as plasticizers and modifying agents for plastic compositions and other similar products.

The esters of this invention are formed on heating at reaction temperature, a higher aliphatic, saturated monocarboxylic acid, that is an acid containing more than 5 carbon atoms, with an excess, and preferably with at least twice the equimolecular amount, of an alkyl lactate, and removing the water formed in the reaction by distillation during the reaction.

The alkyl lactates best adapted for use in our process are those containing from 2 to 12 carbon atoms in the alkyl group, such as ethyl, propyl, butyl, amyl, hexyl, heptyl, octyl, 2-ethyl-hexyl, nonyl or lauryl lactates. Suitable aliphatic monocarboxylic acid include for example those containing from 6 to 18 carbon atoms, such as caproic, heptoic, caprylic, myristic, lauric or stearic acids. In view of the superior properties of the resulting products the process is most advantageously applied to the use of butyl lactate in conjunction with lauric acid.

The reaction rate can be increased by conducting the process in the presence of a catalyst such as sulfuric acid, toluene sulfonic acid or other acidic esterification catalysts, and removal of water during the reaction is facilitated by the use of an entraining agent such as benzene, toluene or the like. Formation of the desired products can be promoted by addition to the reaction mixture of suitable amounts of the corresponding alkyl ester of the carboxylic acid used as the reactant, or of this ester and also of the corresponding alkyl ester of lactyllactic acid.

The following examples illustrate the invention.

EXAMPLE I 146 grams (1 mole) of butyl lactate, 100 grams (0.5 mole) of lauric acid, 128 grams (0.5 mole) of butyl laurate, 1 gram of p-toluene sulfonic acid (monohydrate), and 100 ml. toluene were heated at 157° C. in a one-liter round bottom flask fitted with a modified Barrett moisture trap and condenser, as well as a side arm to hold a thermometer during the esterification and a capillary bubbler during distillation of the products. Nine ml. water was collected in the trap in 3 hours. On cooling the catalyst was neutralized by adding a slight excess of calcium lactate. The reaction mixture was then fractionated under vacuum and the following products were isolated as a distillate.

n-Butyl lactate B. R. 30–40°/1 mm.; 50 grams (0.25 mole)

n-Butyl lactyllactate B. R. 72–76° C./.3–.4 mm.; 28.3 grams (0.13 mole)

n-Butyl laurate B. R. 112/.3–.4 mm.; 145.9 grams (0.57 mole)

n-Butyl lactate laurate B. R. 146–156/.6 mm.; 72.2 grams (0.22 mole)

Using essentially the procedure of the foregoing example n-butyl lactate was reacted with lauric acid under varying conditions. The results thus obtained are shown in the following table.

*Table 1*

| Example | II | III | IV | V | VI | VII | VIII | IX | X |
|---|---|---|---|---|---|---|---|---|---|
| Reactants: | | | | | | | | | |
| Lauric Acid, moles | 1 | 1 | 0.5 | 0.5 | 0.5 | 0.5 | 0.5 | 0.5 | 0.5 |
| n-Butyl Lactate, moles | 3 | 3 | 1 | 1 | 1 | 1 | 1 | 1 | 1 |
| n-Butyl Laurate, moles | | | | | | | 0.5 | | 0.5 |
| p-Toluene Sulfonic acid, gm. (monohydrate) | | 0.1 | 0.1 | 1 | 1 | 1 | 1 | 4 | 1 |
| Entrainer: | | | | | | | | | |
| Benzene, ml | | | | | | 100 | 100 | | |
| Toluene, ml | | | 100 | 100 | | | | 100 | 100 |
| Reaction Temperature, °C | 184–196 | 184–196 | 150–153 | 140–150 | 205–239 | 110–120 | 120–133 | 130–142 | 148–157 |
| Reaction Time, hrs | 13 | 11 | 10 | 2 | 2 | 5 | 5 | 1 | 3 |
| Recovered Products: | | | | | | | | | |
| n-Butyl laurate, moles | 0.5 | 0.5 | 0.1 | 0.2 | 0.3 | 0.2 | 0.6 | 0.3 | 0.6 |
| n-Butyl lactyl lactate, moles | 0.4 | 0.4 | 0.1 | 0.1 | 0.1 | 0.1 | 0.1 | 0.1 | 0.1 |
| n-Butyl lactate laurate, moles | 0.3 | 0.4 | 0.2 | 0.2 | 0.2 | 0.2 | 0.3 | 0.1 | 0.2 |

Our preferred product, butyl lactyllactate laurate, is not listed among the recovered products described above, in Example I, because it is in the distillation residue remaining after distillation removal of the butyl laurate fraction. This is fully described in Example XV below; particularly in the paragraphs preceding and following Table 2. The butyl laurate and butyl lactyllactate fractions obtained on distillation are preferably returned to the reaction in order to increase the yields of the said preferred product. This is also explained in Example XV.

EXAMPLE XI

One mole of n-butyl lactate was reacted with 0.5 mole of lauric acid as described in Example I, using 0.25 gram of concentrated sulfuric acid as a catalyst and 100 ml. of toluene as the entraining agent. The reaction mixture was heated at about 148° C., for approximately 9 hours. Vacuum distillation of the products so obtained yielded 0.1 mole of n-butyl lactyl lactate, 0.2 mole of n-butyl lactate laurate and 0.2 mole of n-butyl laurate.

EXAMPLE XII 0.9 mole secondary-butyl lactate was reacted with 0.5 mole of lauric acid as described in Example I, using 1 gram of p-toluene sulfonic acid monohydrate as a catalyst and 100 ml. of toluene as the entraining agent. The reaction mixture was heated at 140–142° C., for 2 hours. Vacuum distillation of the products so obtained yielded 0.1 mole of sec. butyl lactyl laurate, 0.1 mole of sec. butyl laurate and 0.3 mole of sec. butyl lactate laurate.

EXAMPLE XIII

One mole of capryl lactate was reacted with 0.5 mole of n-caprylic acid, as described in Example I, using 1 gram of p-toluene sulfonic acid as a catalyst and 100 ml. of toluene as the entraining agent. The reaction mixture was heated at 146–152° C. for 4 hours after which 0.2 mole caprylic acid, 0.5 mole of capryl lactate and 0.27 mole capryl lactate n-caprylate were recovered by vacuum distillation.

EXAMPLE XIV

The procedure described in Example I was used in reacting 1 mole of capryl lactate with 0.5 mole lauric acid, at 152–153° C. for 3.5 hours, in the presence of 1 gram p-toluene sulfonic acid monohydrate, and using 100 ml. toluene as the entraining agent. Vacuum distillation of the product gave 0.37 mole capryl lactate laurate.

EXAMPLE XV

The distillates collected at temperatures above the boiling range of the n-butyl lactate laurate fraction, on vacuum distillation of the reaction products in each of the Examples I through X, were combined and the resulting mixture distilled in vacuum. The fraction collected at 186°–190° C./1.2 mm. was found to consist essentially of butyl lactyl lactate laurate having the following characteristics.

$n_D^{20}$, 1.4415
$d_4^{20}$, 0.9677
Ester equivalent, 132.6
C: Found, 65.47%
   Calculated, 65.97%
H: Found, 10.02%
   Calculated, 10.07%

A series of experiments was conducted according to the general procedure described in Example I. In each of these experiments 1 mole of butyl lactate and 0.5 mole of lauric acid were used, and the weight ratios of catalyst and entraining agent to the total amount of other ingredients were maintained constant. The butyl laurate and butyl lactyllactate fractions obtained on distillation of the reaction product of each experiment were added to the reactants of the succeeding run. The experimental data so obtained are listed in Table 2.

*Table 2*

| Example: | XVI | XVII | XVIII | XIX | XX | XXI |
|---|---|---|---|---|---|---|
| Composition of Reaction Mixture: | | | | | | |
| n-Butyl Lactate, grams | 146 | 146 | 146 | 146 | 146 | 146 |
| Lauric Acid, grams | 100 | 100 | 100 | 100 | 100 | 100 |
| n-Butyl Laurate, grams | | 76 | 139 | 170 | 222 | 252 |
| n-Butyl Lactyllactate, grams | | 28 | 40 | 58 | 62 | 49 |
| p-Toluene sulfonic acid, grams | 1 | 1.4 | 1.7 | 1.9 | 2.15 | 2.22 |
| Toluene, ml | 100 | 140 | 170 | 190 | 215 | 222 |
| Products Recovered: | | | | | | |
| n-Butyl Lactate, grams | 46 | 55 | 66 | 53 | 78 | 61 |
| n-Butyl Laurate, grams | 76 | 139 | 170 | 222 | 252 | 253 |
| n-Butyl Lactyllactate, grams | 28 | 40 | 58 | 62 | 49 | 63 |
| Distillation Residue | 78 | 96 | 104 | 115 | 115 | 138 |

In all these experiments the product obtained as the distillation residue following removal of the butyl laurate fraction had a substantially constant index of refraction $n_d^{20}$ 1.4403±0.0005, and on redistillation was found to consist essentially of butyl lactate laurate and butyl lactyllactate laurate in the molecular proportions of approximately 2 to 1.

Thus it was found that within certain limits an equilibrium of products and reactants is reached, and that best yields of the desired products that is, butyl lactate laurate and butyl lactyllactate laurate are obtained on using an initial mixture containing approximately 1 mole of butyl laurate, and 0.3 mole of butyllactyllactate, per 1 mole of butyl lactate and 0.5 mole lauric acid.

Similar results are obtained on using other alkyl esters in place of the butyl esters of the foregoing examples, and other higher fatty acids containing from 6 to 18 carbon atoms in lieu of lauric acid.

The plasticizing efficiency of some of the products of this invention as compared with di-2-ethyl hexyl phthalate, was determined by compounding them with polyvinyl chloride-acetate copolymer (95% vinyl chloride, 5% vinyl acetate) using a procedure analogous to that described by Kent and Weaver, 1947 India Rubber World, 115, 813–816.

| Plasticizer | 100% Modulus of the Plasticized Material p.s.i. |
|---|---|
| Butyl lactate laurate | 1,190 |
| Butyl lactyllactate laurate | 1,400 |
| Distillation residue of Examples XVI–XXI | 1,250 |
| Mixture of equal parts, by weight of: | |
| Capryl lactate laurate and di-2-ethyl hexyl phthalate | 1,520 |
| Di-2-ethyl hexyl phthalate | 1,500 |

Having thus disclosed our invention we claim:

1. The process of preparing an ester of an acylated lactyllactic acid corresponding to the general formula $$R-\underset{\underset{O}{\|}}{C}-O-CH(CH_3)-\underset{\underset{O}{\|}}{C}-O-CH(CH_3)-\underset{\underset{O}{\|}}{C}-OR'$$

wherein R and R' are alkyl radicals containing from 5 to 17 and from 2 to 12 carbon atoms respectively, which comprises heating a molar excess of alkyl lactate having from 2 to 12 carbon atoms in the alkyl group with a saturated aliphatic monocarboxylic acid having from 6 to 18 carbon atoms, and concurrently removing the water formed in the reaction by distillation the heating being at a temperature of at least about 100° C. and in the presence of an acidic esterification catalyst and an organic solvent water entraining agent, the heating being for several hours, to form a distillation residue containing said ester.

2. The process of preparing butyl lactyllactate laurate having the formula

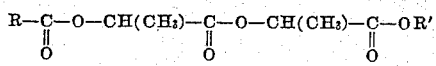

which comprises heating at reaction temperature a molar excess of butyl lactate with lauric acid and continuously removing the water formed in the reaction by distillation.

3. The process of claim 2 wherein the lauric acid is heated with at least two molecular proportions of butyl lactate in the presence of an acidic esterification catalyst, and the water is removed from the reaction mixture by azeotropic distillation with an entraining agent.

4. The process of claim 3 wherein the acidic esterification catalyst is p-toluene sulfonic acid and the entraining agent is toluene.

5. The process which comprises forming a mixture of butyl lactate, lauric acid, butyl laurate and butyl lactyllactate in approximate proportions of 0.5 mole of lauric acid, 1 mole butyl laurate and 0.3 mole butyl lactyllactate per mole of butyl lactate, heating the mixture at a temperature within the range of about 100–210° C., to remove the water formed in the reaction by distillation, thereafter subjecting the reaction mixture to distillation under reduced pressure to recover butyl esters of lactic, lauric and lactyllactic acids in the distillate and to produce a distillation residue consisting essentially of a mixture of butyl lactate laurate and butyl lactyllactate laurate in the molecular proportions of approximately 2 to 1.

6. A compound corresponding to the general formula

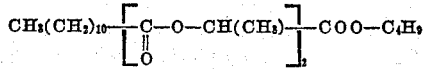

wherein R and R' are alkyl radicals containing from 5 to 17 and from 2 to 12 carbon atoms, respectively.

7. A composition of matter comprising butyl lactyllactate laurate having the formula:

$CH_3(CH_2)_{10}-CO-O-CH(CH_3)-$
$CO-O-CH(CH_3)-COO-C_4H_9$

8. A composition of matter comprising a mixture of butyl lactate laurate and butyl lactyllactate laurate in the molecular proportions of approximately two to one.

9. A composition of matter having an index of refraction $n_d^{20}$ 1.4403±0.0005 and consisting essentially of a mixture of butyl lactate laurate and butyl lactyllactate laurate.

10. The process of claim 1 in which at least two molecular proportions of alkyl lactate are present in the reaction, and with addition of the corresponding alkyl ester of said saturated aliphatic monocarboxylic acid to the reaction mixture.

11. A process of preparing butyl lactyllactate laurate comprising heating at reaction temperature a molar excess of butyl lactate with lauric acid, adding to the reaction mixture butyl laurate and butyl lactyllactate which had been recovered as by-product from reaction of butyl lactate with lauric acid, and continuously removing the water formed in the reaction by distillation.

CHARLES H. FISHER.
MARTIN L. FEIN.

REFERENCES CITED

The following references are of record in the file of this patent:

UNITED STATES PATENTS

| Number | Name | Date |
|---|---|---|
| 1,927,295 | Powers | Sept. 19, 1933 |

OTHER REFERENCES

Fein et al., Ind. and Eng. Chem., March 1944, pages 235–238.

Filachione et al., Ind. and Eng. Chem., May 1944, pages 472–475.